(12) United States Patent
Alfano et al.

(10) Patent No.: US 6,215,587 B1
(45) Date of Patent: *Apr. 10, 2001

(54) MICROSCOPE IMAGING INSIDE HIGHLY SCATTERING MEDIA

(76) Inventors: Robert R. Alfano, 3777 Independence Ave., Bronx, NY (US) 10463; Gordon E. Anderson, 66-38 Saunders St., Rego Park, NY (US) 11374; Feng Liu, 3055 Bailey Ave., #E2, Bronx, NY (US) 10463

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/659,615

(22) Filed: Jun. 6, 1996

Related U.S. Application Data

(63) Continuation of application No. 08/195,640, filed on Feb. 14, 1994, now abandoned.

(51) Int. Cl.⁷ ................................................ G02B 21/00
(52) U.S. Cl. .......................... 359/368; 359/385; 359/396; 359/559
(58) Field of Search ................................ 359/368, 385, 359/396, 559, 376; 250/486.1; 358/95, 110, 111; 356/336, 339, 337, 342

(56) References Cited

U.S. PATENT DOCUMENTS

| | | | |
|---|---|---|---|
| 4,246,487 | * | 1/1981 | Anger et al. ...................... 250/396 R |
| 4,262,208 | * | 4/1981 | Suzuki et al. ......................... 250/548 |
| 4,434,367 | * | 2/1984 | Yonezawa ............................ 250/311 |
| 4,577,964 | * | 3/1986 | Hansen, Jr. ............................ 356/39 |
| 5,140,463 | * | 8/1992 | Yoo et al. ............................ 359/559 |
| 5,159,412 | * | 10/1992 | Willenborg et al. ................. 356/381 |
| 5,351,152 | * | 9/1994 | Kuo et al. ............................ 359/376 |
| 5,434,901 | * | 7/1995 | Nagai et al. ............................ 378/43 |
| 5,621,500 | * | 4/1997 | Shiraishi ................................ 355/71 |

* cited by examiner

*Primary Examiner*—Mohammad Y. Sikder
(74) *Attorney, Agent, or Firm*—Kriegsman & Kriegsman

(57) ABSTRACT

A method and system for imaging a small object in or behind a highly scattering medium comprises a laser source for illuminating the object with an ultrashort collimated beam of light and a novel microscope for forming a magnified image of the object using light emergent from the highly scattering medium, the emergent light consisting of a scattered component and a non-scattered component. The novel microscope comprises an objective, an eyepiece and an aperture centered at the back focal plane of the objective. The aperture, which may be of a fixed or variable size and controlled electronically or by a computer serves to spatially filter the scattered light component of the light emergent from the highly scattering medium. The system may also comprise a streak camera or similar time resolving device positioned at the image plane of the microscope for temporally filtering the scattered light component of the light emergent from the highly scattering medium.

11 Claims, 7 Drawing Sheets

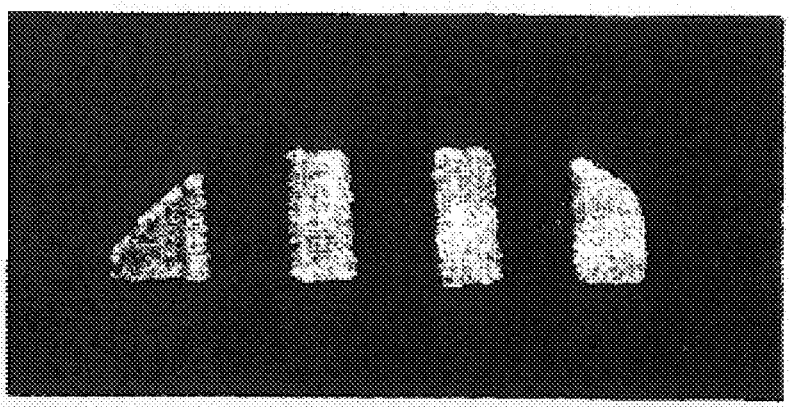
Fig. 3(a)
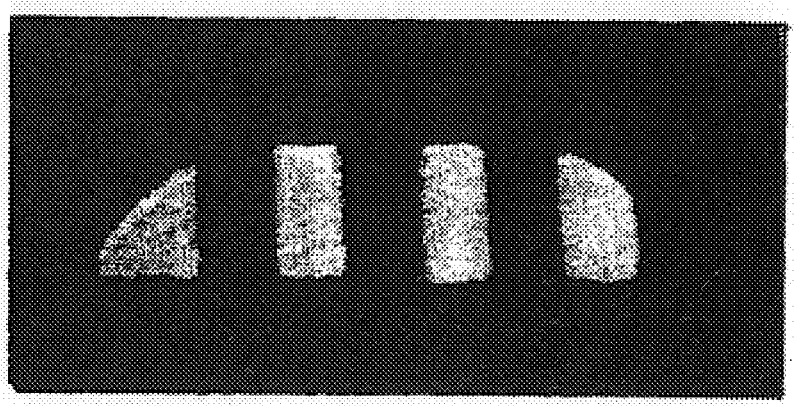
Fig. 3(b)
1/3 mm

1/3 mm

1/3 mm

1/3 mm

MICROSCOPE IMAGING INSIDE HIGHLY SCATTERING MEDIA

This application is a continuation of application Ser. No. 08/195,640 filed on Feb. 14, 1994, now abandoned.

BACKGROUND OF THE INVENTION

The present invention relates generally to the imaging of small objects in or behind highly scattering media and more particularly to the imaging of small objects in or behind highly scattering media using microscopes.

Many small objects that we wish to observe are hidden inside or behind some kind of semi-opaque random media. Examples of such objects include subcellular components within a cell, tumors inside a breast, defects in a semiconductor, objects in tissue, etc.

When a light pulse propagates through a highly scattering medium, some of the light is multiply scattered. The multiple scattering of light reduces the intensity of the signal and increases the noise on the signal arising from the randomly scattered light. The reduction in signal and the increase in noise from multiple scattered light are the main reasons why one cannot see through an optically thick random medium. Thus, one way to enhance the quality of an image in or behind a scattering medium is to reduce the scattered light noise. The scattered light noise is typically made up of those components of the light pulse which (1) emerge from the medium at an angle relative to the angle of incidence of the light pulse on the medium; and/or (2) take the longest period of time to emerge from the medium.

In U.S. Pat. No. 5,140,463, inventors Yoo et al., which issued Aug. 18, 1992, and which is incorporated herein by reference, there is disclosed a method and apparatus for improving the quality of an image of an object hidden inside a highly scattering, semi-opaque, disordered medium using space gate imaging or time gate imaging or space time gate imaging. According to the patent, in space gate imaging, a small segment of the object is illuminated at a time. The scattered light is passed through a spatial noise filter. On the image plane, an aperture is open at the position of the image segment which corresponds to the segment of the illuminated object. A full image is obtained by scanning the object, segment by segment, and simultaneously recording the signal at the corresponding image segment. In time gate imaging, the unscattered (i.e. ballistic) portion of the pulse which contains the information of the image is temporally separated from the other (i.e. scattered) portions which contain the noise using an ultrafast laser pulse and temporal gating devices. In space-time gating, the two techniques are combined to produce an image with a much higher signal to noise ratio. The time separation between the ballistic and scattered light may be increased by increasing thickness of random medium or by introducing small scatters into the random medium so as to make the medium more random. The signal to noise ratio can also be increased by making the random medium less random (so that there will be less scattered light). In addition, the signal to noise ratio can be increased by introducing an absorbing dye into the medium or by using a wavelength for the light which is in the absorption spectrum of the random medium or by making the medium more ordered (i.e. less random) or by using a pair of parallel polarizers.

In U.S. patent application Ser. No. 07/920,193 and U.S. Pat. No. 5,371,368, inventors Robert R. Alfano et al., which was filed Jul. 23, 1992, and which is incorporated herein by reference, there is disclosed a system for imaging an object in or behind a highly scattering medium. According to the patent application, the system includes a laser for transilluminating the highly scattering medium. The light emerging from the highly scattering medium consists of a ballistic component, a snake-like component and a diffuse component. In one embodiment of the invention, a Kerr gate is used to temporally gate the light exiting the transilluminated medium. The Kerr gate, which is controlled by a pump beam of light, opens for an appropriately short period of time to permit the ballistic and snake components of the light exiting the medium to pass therethrough for imaging and then closes to prevent the diffuse component of the light from passing therethrough. In another embodiment of the invention, a 4F Fourier gate is additionally used to spatially gate the light exiting the transilluminated medium. The 4F Fourier gate improves image quality by filtering out the components of light exiting the medium at large angles, i.e., the diffuse component. The Kerr gate and the 4F Fourier gate may be combined by placing the Kerr gate at the 2F spectral plane and by gating only that portion of the Kerr gate situated at the focal point of the 4F Fourier system.

In U.S. patent application Ser. No. 07/927,566 which is abandoned on Jan. 28,1994, inventors Robert R. Alfano et al., which was filed Aug. 10, 1992, and which is incorporated herein by reference, there is disclosed a technique for forming an image of an object located in or behind a scattering medium. In one embodiment, the object is made luminescent, and the luminescent light is selected for imaging while the illuminating light is filtered out. The quality of the image can be further improved by selecting the portion of the luminescence spectrum that is strongly absorbed by the scattering medium.

Neither the aforementioned patent nor the aforementioned patent applications are directed to the imaging of objects in highly scattering media using microscopes.

Microscopes are optical devices commonly used to examine small objects at large magnifications. In its simplest form, a microscope comprises an objective and an eyepiece. The objective typically comprises one or more lenses which are used to form a real, inverted and much enlarged image of an object on the focal plane of the eyepiece. The eyepiece (or ocular) acts as a collimator so that one looking into it sees a virtual image of the object, subtending a wide angle. Many microscopes include a light source for illuminating or transilluminating the medium in which the object is located.

Ordinary microscopes cannot obtain clear images of objects hidden inside or behind highly scattering cloudy media. Scanning confocal microscopes, however, have been used to locate some objects in highly scattering media and have been used with some success to form images of some objects in highly scattering media. Moreover, by combining the techniques of dye staining and multiple photon nonlinear optical excitation with confocal microscopy, improved images of objects inside highly scattering media have been obtained. Time-resolved techniques have also been used with confocal microscopy to improve the images of objects located inside highly scattering media.

Publications of interest include F. G. Smith and J. H. Thomson, "Optics," 2nd Ed., Manchester Physics Series, John Wiley, pp. 214–217 (1988); "Introduction to Optics," F. Pedrotti and L. Pedrotti, Prentice Hall (2nd), pp. 135–138 (1993); R. W. Ditchburn, "Light," John Wiley, 2nd Ed., pp. 290–295 (1963); and Kempe and Rudolph, "Analysis of confocal microscope under ultrashort light pulse illumination," JOSA A, Vol. 10, pp. 240–245 (1993).

SUMMARY OF THE INVENTION

It is an object of the present invention to provide a new and novel microscope.

It is another object of the present invention to provide a microscope as described above that can be used to image objects in highly scattering media with greater resolution than can typically be attained using existing microscopes.

Additional objects, as well as features and advantages thereof, will be set forth in part in the description which follows, and in part will be obvious from the description or may be learned by practice of the invention. The objects of the invention also may be realized and attained by means of instrumentalities and combinations particularly pointed out in the appended claims.

In its simplest form, a microscope constructed in accordance with the teachings of the present invention comprises (a) an objective, said objective having a back focal plane; (b) an eyepiece; and (c) an aperture located at the back focal plane of said objective.

The aperture, which is used to spatially filter scattered light, may be either fixed or variable in size. If desired, two or more different-sized apertures may be mounted on an adjustable wheel to provide variability in the size of the aperture. The size of the aperture chosen for a particular application may be controlled to determine the best contrast, i.e. c=I max−I min/I max+I min, of a given region using a computer or electronics.

As can readily be appreciated, the microscope of the present invention can be either a conventional microscope or a confocal microscope, modified for imaging objects in scattering media.

In addition to being directed to the above-described microscope per se, the present invention is also directed to a method and system for imaging objects in highly scattering media, the method and system involving the use of the aforementioned modified microscope.

BRIEF DESCRIPTION OF THE DRAWINGS

The accompanying drawings, which are hereby incorporated into and constitute a part of this specification, illustrate the preferred embodiments of the invention and, together with the description, serve to explain the principles of the invention. In the drawings wherein like reference numerals represent like parts:

FIGS. 3(a) and 3(b) are images of a test bar chart not located in or behind a scattering medium taken using (a) a system similar to that of FIG. 2 with the aperture at the back focal plane of the objective having been removed, and (b) the system of FIG. 2, respectively, the streak camera with CCD detector being operated in steady-state focus mode for both images;

DETAILED DESCRIPTION OF PREFERRED EMBODIMENTS

Figure 1:
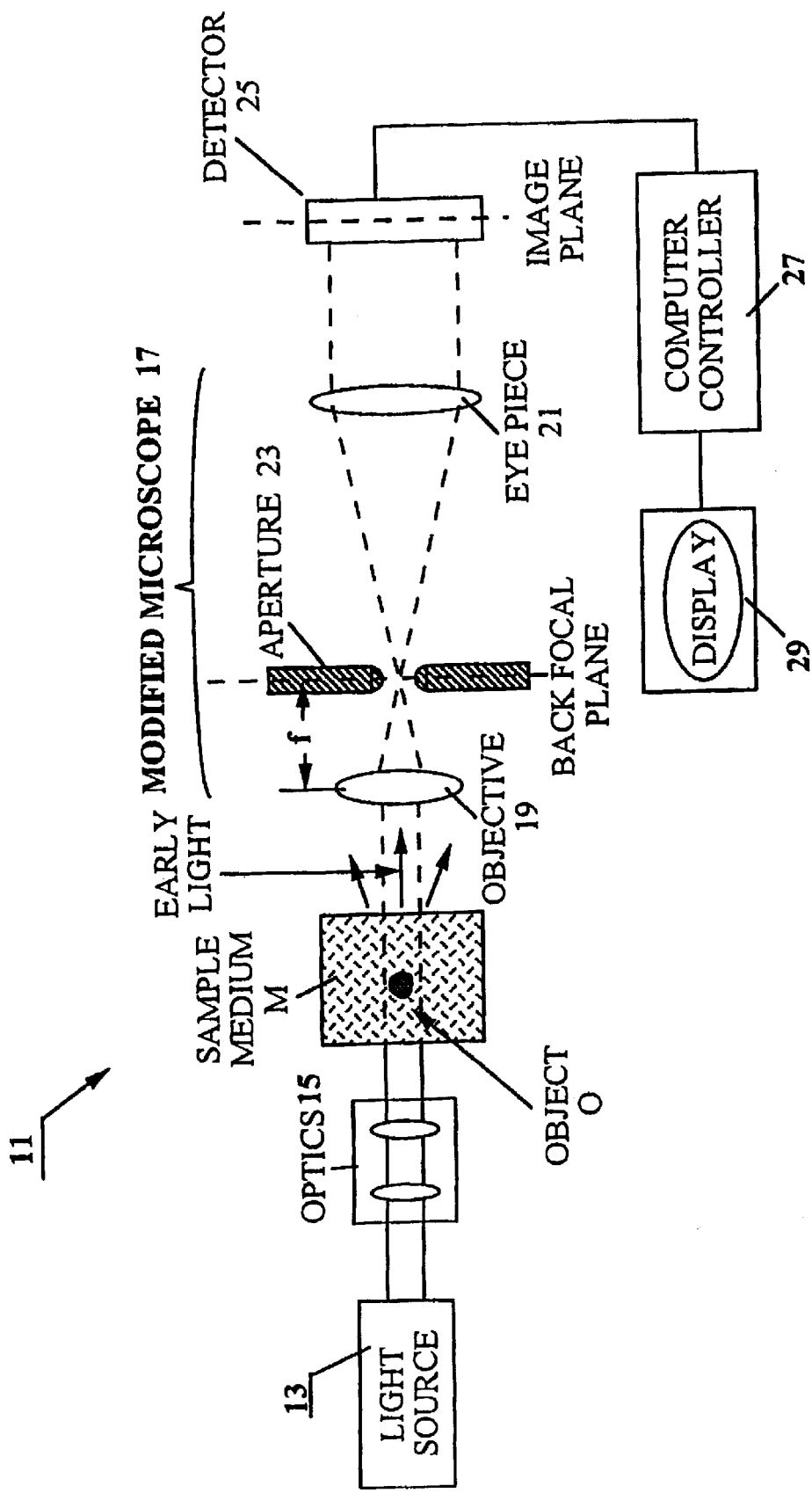
FIG. 1 is a schematic diagram of one embodiment of a system for imaging an object located in or behind a highly scattering medium, the system being constructed according to the teachings of the present invention.

As noted above, the present invention is directed to the discovery that improved images of objects observed using microscopes can be obtained by placing an aperture at the back focal plane of the microscope objective, such an aperture serving to spatially filter scattered light. This image can be further improved by combining spatial filtering of the type described above with time filtering, e.g. by using a streak camera or similar device to time-resolve the spatially filtered light so as to further eliminate scattered light.

As can readily be appreciated, the present invention has great applicability in the imaging of objects located in or behind scattering media since the propagation of light through such media results in scattering, which adversely affects the clarity of the image.

Although not predicating their invention on any particular theory, the present inventors believe that the principles underlying their invention can be aptly described below.

Consider first using a microscope to obtain the image of an object not located in or behind a random scattering medium. According to modern optical theory, the spatial Fourier transform of the image is located (or "angle resolved") in the back focal plane of the microscope objective. Most of the image information is carried by the low spatial frequency light which is located at the center of the back focal plane of the microscope objective. The higher spatial frequency light (which carries the detailed diffraction pattern of the object) is located away from the center of the back focal plane of the microscope objective. One can obtain an image of an object by using the low frequency light alone (but, of course, with somewhat less diffraction detail).

Consider now an object hidden inside or behind a highly scattering host medium. Most of the would-be image light is multiply scattered in all spatial directions by the medium, with the light emerging from the host scattering medium having a wide range of spatial frequencies of equal intensities. Consequently, the image of the object becomes degraded by the high spatial frequency, multiply scattered light. Indeed, the image of the object cannot be obtained at all using conventional microscopes when there is strong enough scattering. According to the present invention, however, enhancement of the degraded image is obtained by placing a spatial aperture at the center of the focal plane of the objective lens to eliminate the noisy, multiply scattered light from being detected. The aperture can have a variable size and can be used to improve both conventional and confocal microscopes for imaging objects of various sizes inside or behind highly scattering media.

Because the scattered light tends to have a larger path length than the non-scattered light, the useful image-information-carrying light typically emerges from the medium just prior to the emergence of the noisy scattered light from the medium. Accordingly, one can further improve the image quality by detecting only the early arriving image light using time-resolved detection techniques.

Referring now to FIG. 1, there is shown a schematic diagram of a first embodiment of a system constructed according to the teachings of the present invention for imaging an object o located in or behind a highly scattering sample medium M, the system being represented by reference numeral 11.

System 11 includes a light source 13 for emitting light and optics 15 for collimating the light emitted from light source 13 for use in illuminating scattering medium M. System 11 also includes a modified microscope 17 for forming a magnified image of the light emergent from scattering medium M. Microscope 17 comprises an objective 19, an eyepiece 21 and an aperture 23, aperture 23 being centered at the back focal plane of objective 19. For purposes of the present invention, aperture 23 may either be a fixed diameter aperture or a variable diameter aperture or a plurality of apertures of different sizes mounted on a rotatable wheel (not shown). Aperture 23 may have a diameter, for example, of about 100 microns to about 5 millimeters.

System 11 further includes a light detector 25, such as a CCD detector, positioned at the image plane of microscope 17 for use in converting the magnified image of the object into a series of electrical signals, a computer controller 27 for processing the electrical signals outputted by detector 25 and adjusting the size of the aperture 23 (if variable) to achieve the best contrast and a display 29 for displaying the processed electrical signals, preferably in the form of an image of the object.

Instead of being adjusted by controller 27, aperture may be adjusted by electronics (not shown). It should be understood that, instead of using light detector 25, controller 27 and diplay 29, a person could view the magnified image by placing his/her eye or a CCD detector on the image plane.

As can be seen, light emergent from medium M at a substantial angle relative to its angle of incidence, i.e. scattered light, is spatially filtered by aperture 23.

Figure 2:
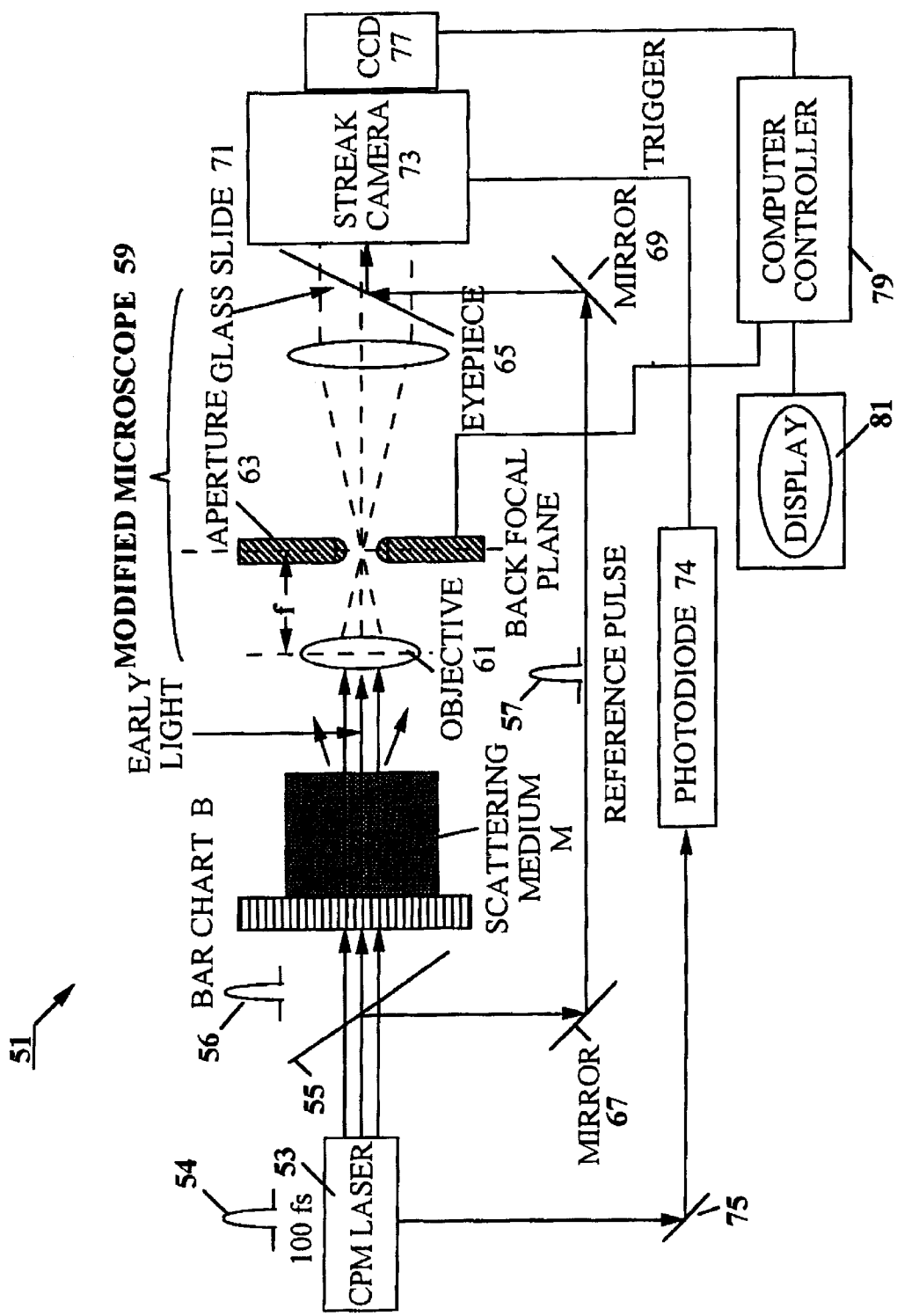
FIG. 2 is a schematic diagram of an experimental system set up to image various objects which may be located in or behind a highly scattering medium, the system being constructed according to the teachings of the present invention.

Referring now to FIG. 2, there is shown a schematic diagram of an experimental system set up in accordance with the teachings of the present invention to image various objects which may or may not be located in or behind highly scattering media, the system being represented by reference numeral 51. In the embodiment shown in FIG. 2, system 51 is being used to image an Air Force test bar chart B located behind a highly scattering media M.

System 51 comprises a colliding pulse mode-locked (CPM) laser 53 for generating a series of 100 fs light pulses 54 each having a wavelength of 625 nm and a 4 mm beam diameter. A beam splitter 55 splits each pulse 54 into an illuminating pulse 56 and a reference pulse 57. The illuminating pulse 56 is incident on bar chart B positioned in front of a slab of scattering medium M. The light t ransmitted through medium M is then magnified by a modified microscope 59 comprising a 4× objective 61, an aperture 63 centered at the back focal plane of objective 61 and an eyepiece 65. Aperture 63, which serves as a spatial filter to eliminate much of the scattered light emergent form medium M, may be either a fixed diameter aperture or a variable size aperture or a plurality of, of different sizes, mounted on a rotatable wheel (not shown). Aperture 63 may have a diameter, for example, of about 100 microns to about 5 millimeters. Instead of a CPM laser, a HeNe laser or a YAG laser or a semiconductor laser or a lamp could be employed.

The reference pulse 57, which is reflected off a pair of mirrors 67 and 69, is combined with the light imaged by microscope 59 using a glass slide 71.

System 51 further includes a streak camera 73 positioned at the image plane of microscope 59. Streak camera 73 is coupled to a photodiode 74 which, in turn, is actuated by the output of laser 53 (reflected off a mirror 75). In this manner, the triggering of streak camera 73 may be synchronized with the arrival of the image of the object at the image plane. Streak camera 73 is capable of being used in either a time-resolved mode or a steady-state mode. The output of streak camera 73 is coupled to a CCD light detector 77, which converts the light image into a series of electrical signals. These signals are then processed by a computer controller 79, which also controls the size of aperture 63, if variable, and the processed signals are displayed on a display 81.

If desired, system 51 could also include spectral filters (not shown) for use in isolating fluorescence emitted from the object. Instead of being controlled by computer controller 79, the size of aperture 63, if variable, could be controlled by electronics (not shown).

Referring now to FIGS. 3(a) and 3(b), there are shown a pair of images of a test bar chart not positioned in or behind a scattering medium, the images obtained using (a) a system similar to that of FIG. 2 with the aperture at the back focal plane of the objective having been removed, and (b) the system of FIG. 2 with a 0.5 mm diameter circular aperture, respectively, the streak camera with CCD detector being operated in steady-state focus mode for both images. The test bar chart shown is Group 1, pattern 4 of the Air Force test pattern, corresponding to a spacing of approximately 167 $\mu$m per dark or clear bar. As can be seen, the image quality in FIGS. 3(a) and 3(b) is about the same, even with such a small aperture, although some diffraction details are lost in FIG. 3(b), due to removal of higher spatial frequencies, depending on the size of the aperture.

Figure 4:
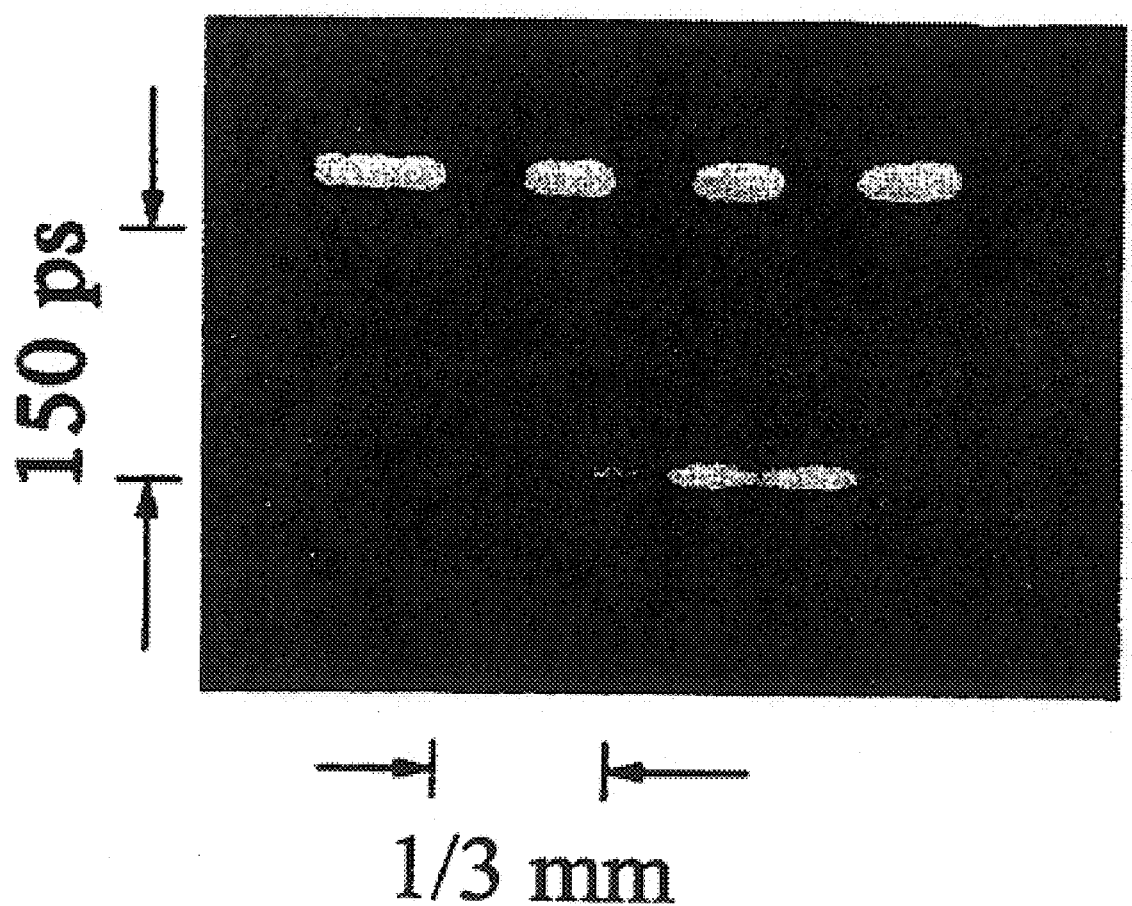
FIG. 4 is an image of a test bar chart not located in or behind a scattering medium taken using the system of FIG. 2, the streak camera with CCD detector being operated in time-resolved mode.

FIG. 4 shows the image taken under the same experimental conditions as in FIG. 3(b), but detected in streak mode. The width of the input slit of the streak camera was reduced to 100 $\mu$m. The pulse on the left is a reference pulse to mark the zero time. The main pulse on the right clearly shows a one-dimensional image of the bar chart. The time response of the system was about 10 ps.

Referring now to FIGS. 5(a) through 5(d), there are shown four images of bar chart B located behind a scattering medium consisting of Intralipid solution of 1.5% volume concentration contained in a glass cell, the images of FIGS. 5(a) through 5(d) taken (a) using a system similar to that of FIG. 2 with the aperture at the back focal plane of the objective having been removed, (b) using the system of FIG. 2 with a 3 mm diameter circular aperture, (c) using the system of FIG. 2 with a 1 mm diameter circular aperture, and (d) using the system of FIG. 2 with a 0.5 mm diameter circular aperture, respectively. For each of FIGS. 5(a) through 5(d), streak camera 73 was operated in steady-state focus mode.

Figure 5A:
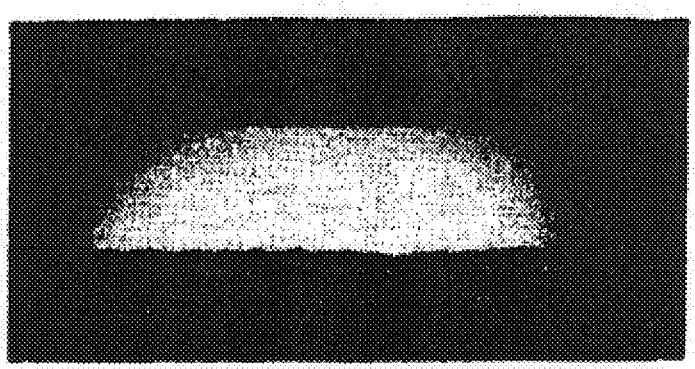
FIGS. 5(a) through 5(d) are images of a test bar chart located behind a scattering medium taken (a) using a system similar to that of FIG. 1 with the aperture at the back focal plane of the objective having been removed, (b) using the system of FIG. 1 with a 3 mm diameter aperture, (c) using the system of FIG. 1 with a 1 mm diameter aperture, and (d) using the system of FIG. 1 with a 0.5 mm diameter aperture, respectively, the streak camera with CCD detector being operated in steady-state focus mode for all four images.
Figure 5B:
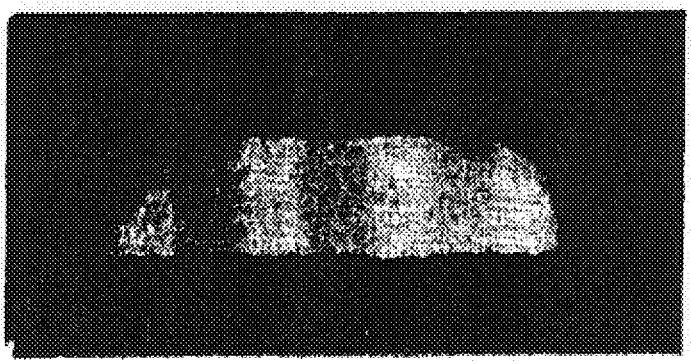
Figure 5C:
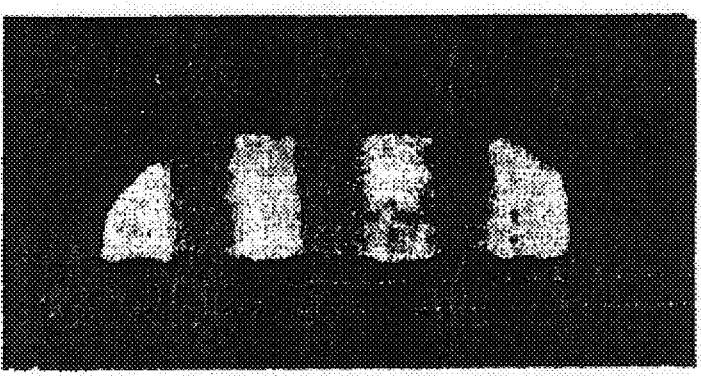
Figure 5D:
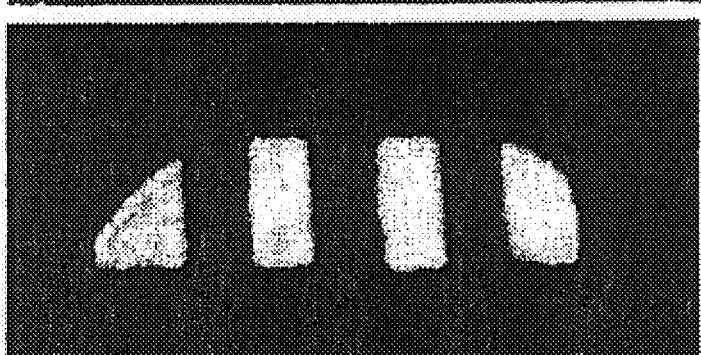

As can be seen, no image of the bars is perceptible in FIG. 5(a) whereas the image of the bars improves in FIGS. 5(b) through 5(d) as the corresponding size of the aperture diminishes. This improvement in contrast is believed to occur with the smaller apertures because higher spatial frequencies are removed the background mutiply scattered noise light diminishes, thereby improving the signal-to-noise ratio and contrast considerably.

Figure 6A:
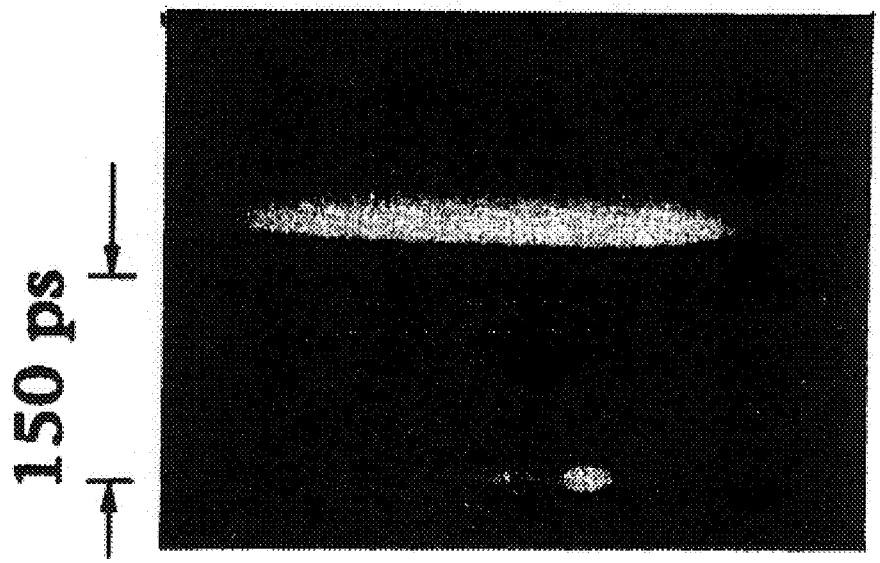
FIGS. 6(a) through 6(d) are images of a test bar chart located behind a scattering medium taken (a) using a system similar to that shown in FIG. 2 with the aperture at the back focal plane of the objective having been removed, (b) using the system of FIG. 2 with a 3 mm diameter aperture, (c) using the system of FIG. 2 with a 1 mm diameter aperture, and (d) using the system of FIG. 2 with a 0.5 mm diameter aperture, respectively, the streak camera with CCD detector being operated in time-resolved mode for all four images.
Figure 6B:
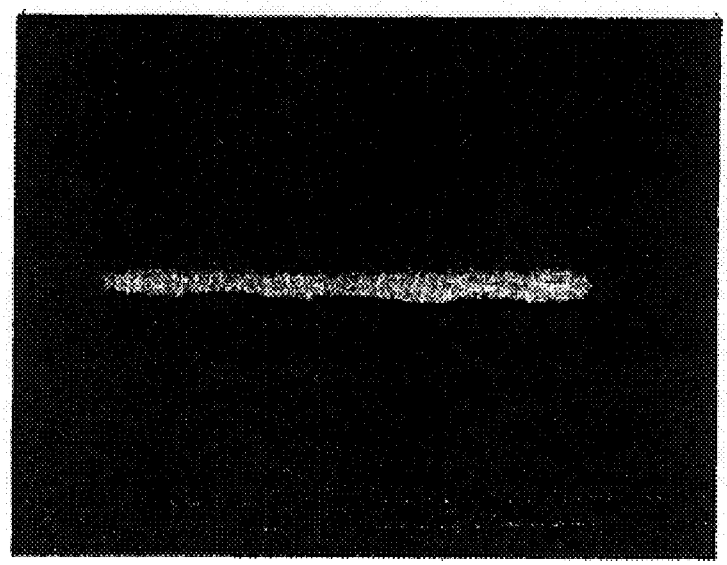
Figure 6C:
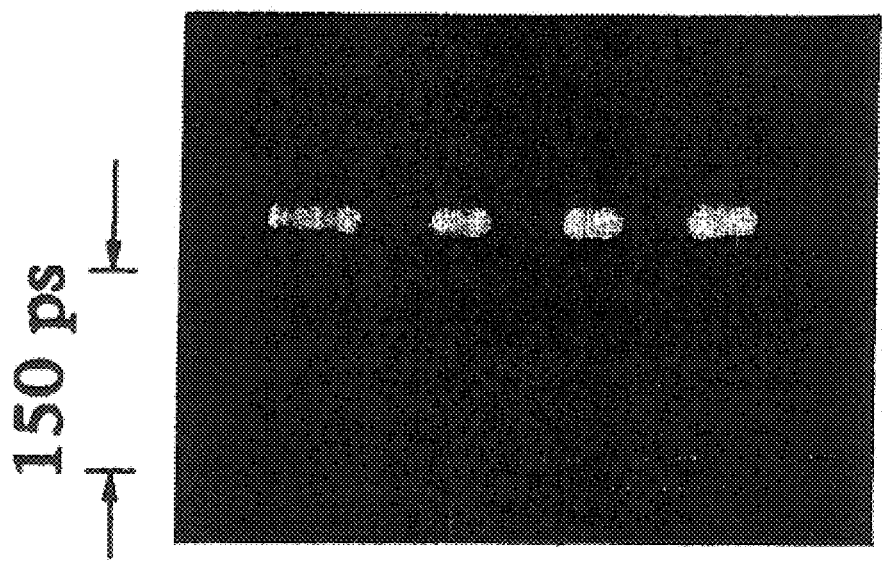
Figure 6D:
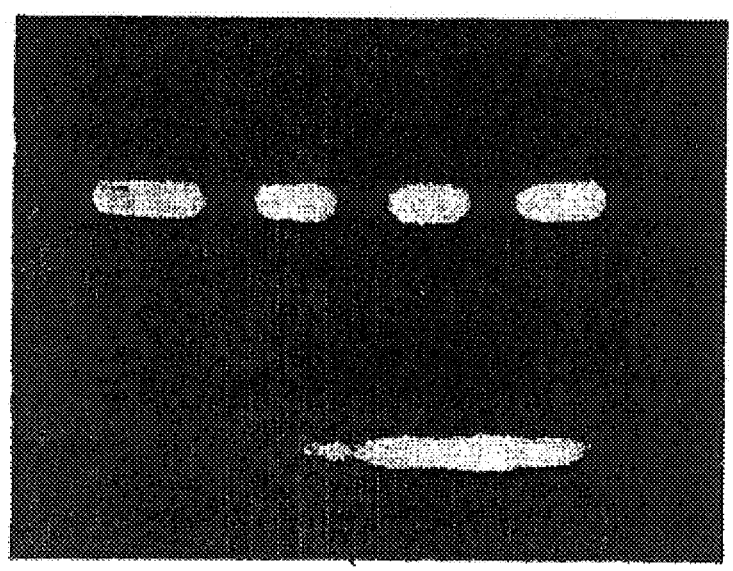

Referring now to FIGS. 6(a) through 6(d), there are shown four images taken under the same experimental conditions as in FIGS. 5(a) through 5(d), except that streak camera 73 is operated in time-resolved mode. As seen by the lack of a clear image of the bar chart in FIG. 6(a), the transmitted pulse is clearly broadened due to multiple scattering inside the random medium. FIG. 6(b) shows the image taken with a 3 mm diameter aperture. The early arriving portion of the transmitted pulse clearly shows the bar chart. No image is seen in the later arriving portion of the transmitted light. Using smaller apertures, the intensity of the later arriving multiply scattered light can be reduced even further. This is illustrated well in FIGS. 6(c) and 6(d) where 1 mm and 0.5 mm apertures, respectively, are used, and the later arriving scattered light is filtered from detection even though the bar chart is clearly seen. By using streak camera 73 in the time-resolved mode, one can obtain a signal-to-noise ratio equivalent to that obtained with the smaller-diameter spatial filters in focus mode, but without having to close the aperture down as far. This results in an even greater image quality (or higher spatial resolution, as is well known from standard optical theory).

In conclusion, the following points should be kept in mind regarding the present invention: (1) The microscope of the present invention can either be a conventional microscope or a confocal microscope; (2) Either continuous wave illumination or ultrashort pulse illumination may be used to illuminate the object to be imaged by the present microscope; and (3) Time-resolved detection techniques (e.g., streak cameras, second harmonic generation) may or may not be used to improve resolution obtained with the present microscope; (4) addition of variable or fixed aperture to a microscope at objective focal plane improves the image and (5) use of microscope for image inside scattering media.

The embodiments of the present invention are intended to be merely exemplary and those skilled in the art shall be able to make numerous variations and modifications to them without departing from the spirit of the present invention. All such variations and modifications are intended to be within the scope of the present invention as defined in the appended claims.

What is claimed is:

1. A system for imaging an object located in a highly scattering medium comprising:
   a) means for illuminating the object located in the highly scattering medium, wherein the light emergent from the highly scattering medium consists of a scattered component and a non-scattered component; and
   b) a microscope for forming a magnified image of the object using the non-scattered component of the light emergent from the highly scattering medium and a portion of the scattered component of the light emergent from the highly scattering medium, said microscope including
      i) objective means for forming an enlarged intermediate image of the object at a back focal plane of said objective means;
      ii) eyepiece means appropriately positioned relative to said objective means for forming a virtual image of the enlarged intermediate image of the object at image plane of said eyepiece means; and
      iii) an aperture located at the back focal plane of said objective means for passing the non-scattered component of the light emergent from the illuminated highly scattering medium and for spatially filtering the scattered component of the light emergent from the illuminated highly scattering medium.

2. The system as claimed in claim 1 wherein said illuminating means comprises a continuous wave light source, a HeNe laser, a semiconductor laser, a lamp, a Ti sapphire laser with SHG or a forsterite laser with SHG and optics for collimating the light emitted from said continuous wave light source.

3. The system as claimed in claim 1 wherein said microscope and said illuminating means are arranged in one of a transmission geometry and a reflection geometry.

4. The system as claimed in claim 1 wherein said aperture is a fixed size aperture.

5. The system as claimed in claim 1 wherein said aperture is a variable size aperture.

6. The system as claimed in claim 1 further comprising means located at the image plane of said microscope for temporally filtering the scattered component of the light emergent from the illuminated highly scattering medium.

7. The system as claimed in claim 6 wherein said temporally filtering means comprises a streak camera.

8. The system as claimed in claim 6 further comprising a light detector for converting the light filtered by said temporally filtering means into electrical signals, means for processing said electrical signals and means for displaying the processed signals.

9. The system as claimed in claim 1 wherein said first aperture has a diameter of about 100 microns to about 5 millimeters.

10. The system as claimed in claim 1 further comprising a light detector positioned at the image plane of said microscope for detecting the magnified image of the object.

11. A system for imaging an object located in a highly scattering medium comprising:
   a) means for illuminating the object located in the highly scattering medium, wherein the light emergent from the highly scattering medium consists of a scattered component and a non-scattered component;
   b) a microscope for forming a magnified image of the object from the light emergent from the highly scattering medium, said microscope including
      i) objective means for forming an enlarged intermediate image of the object at a back focal plane of said objective means;
      ii) eyepiece means appropriately positioned relative to said objective means to form a virtual image of the enlarged intermediate image of the object at image plane of said eyepiece means; and
      iii) an aperture located at the back focal plane of said objective means for spatially filtering the scattered component of the light emergent from the illuminated highly scattering medium;
   c) a light detector positioned at the image plane of said microscope for converting the magnified image of the object into electrical signals;
   d) means for processing said electrical signals and controlling the aperture size for maximizing contrast C for a given region; and
   e) means for displaying the processed signals.

* * * * *